June 3, 1969  H. S. DANKERT ET AL  3,447,995
ANVIL CONSTRUCTION FOR ULTRASONIC SEALING DEVICE
Filed Nov. 12, 1965  Sheet 1 of 2

INVENTORS
HARRY S. DANKERT
HENRY J. GEVERINK
BY
ATTORNEYS

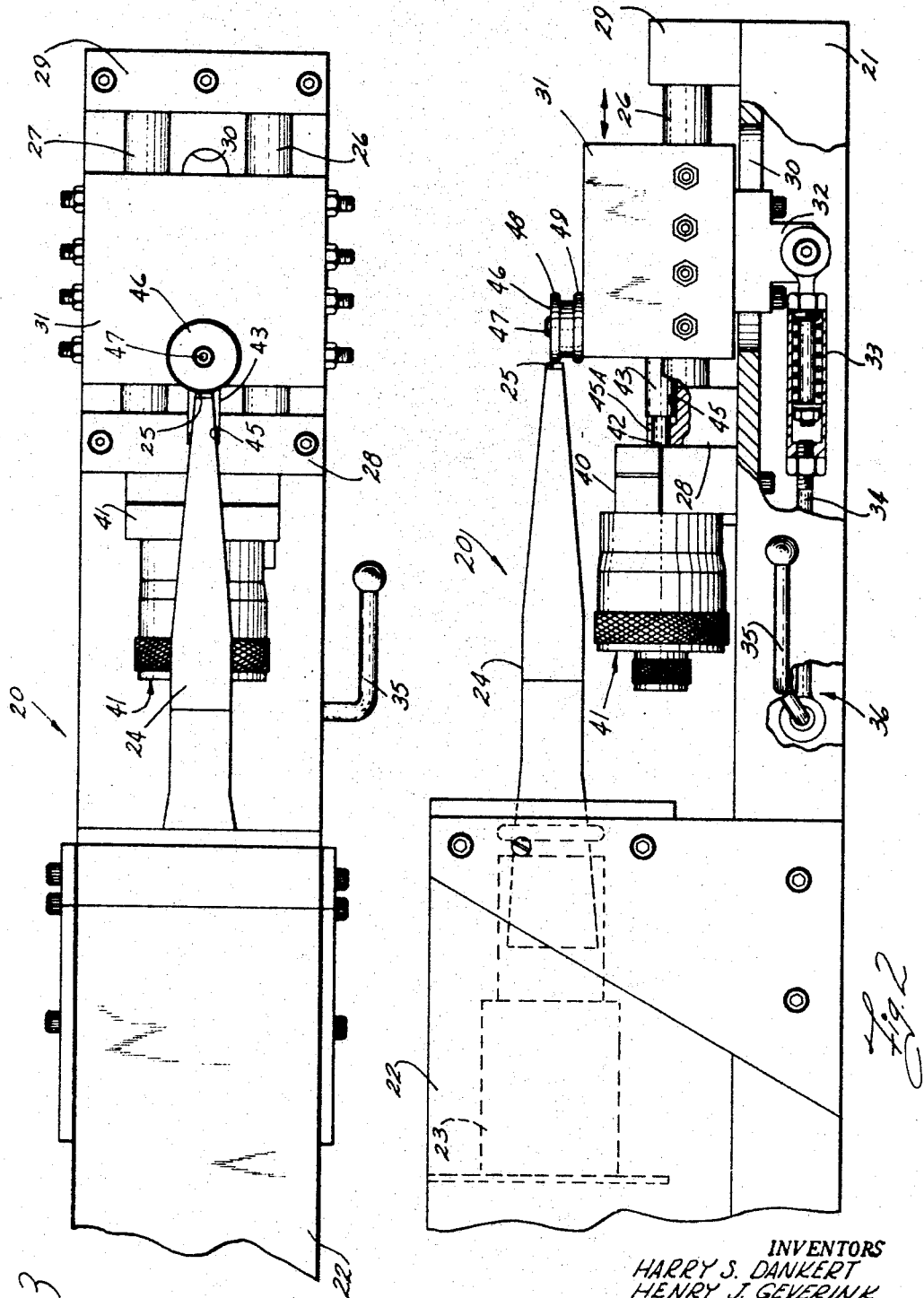

United States Patent Office 3,447,995
Patented June 3, 1969

3,447,995
ANVIL CONSTRUCTION FOR ULTRASONIC
SEALING DEVICE
Harry S. Dankert and Henry J. Geverink, Kalamazoo,
Mich., assignors to The Upjohn Company, Kalamazoo,
Mich., a corporation of Delaware
Filed Nov. 12, 1965, Ser. No. 507,287
Int. Cl. B29c 27/08; B65d 53/06
U.S. Cl. 156—580                    10 Claims

ABSTRACT OF THE DISCLOSURE

An ultrasonic sealing machine having an ultrasonic transducer mounted on a frame and having an elongated tool projecting away therefrom. The tool has a transverse working face at the remote end thereof. An anvil is mounted on the frame and has a working face thereon opposed to the working face of the tool. The anvil is constructed from an essentially nonmetallic, nonplastic material having a high degree of compressive strength and hardness yet a slight capacity for deformation together with a low heat conductivity.

---

This invention relates to an anvil for an ultrasonic sealing machine, and more particularly, relates to an anvil which both has for itself a longer operating life, and makes possible for the sealing tool a longer operating life than other anvils previously used for this purpose.

Ultrasonic sealing machines are used for sealing various types of plastic sheets, such as polyethylene, polypropylene, polyesters and various grades of vinyl sheets. One particular usage with which we are familiar involves sealing bottles for containing pharmaceutical products inside of a polyvinyl chloride shrink film which is used to form a plastic overpackage for the bottle. This involves wrapping the bottle with a layer of the film, bringing the ends of the film into overlapping relation, then sealing the layers together using an ultrasonic sealing machine and, where desired, simultaneously cutting off any excess film material. It will be understood, however, that the foregoing merely indicates one of the many types of sealing operations which can be carried out with ultrasonic sealing machines and such is mentioned by way of example only.

Ultrasonic sealing is effected by the mechanical compression and decompression of the plastic sheet at ultrasonic speeds. This causes molecular heating and consequent fushion of the material. This action is effected by a vibrating tool which is positioned on one side of the sheet and which moves at an ultrasonic frequency in a direction perpendicular to the sheet. The sheet is supported on its other side by an anvil. This type of equipment has been previously known and presents no great problem where fairly thick sheets of plastic film are to be sealed together and particularly presents no special problem where the machine is intended only to seal the plastic sheets together and not to cut them off simultaneously with the sealing operation. However, where a sealing operation is to be performed on relatively thin sheets of film, as 0.0005 inch thick, and particularly where the machine is used to cut or trim the sheets along the sealed edge simultaneously with the sealing operation, a serious problem has arisen in that the tool is subjected to excessive wear. Under some circumstances, utilizing a tool with a tungsten carbide tip and a hardened steel anvil, the tool wears sufficiently to require redressing in as little as two to four hours. While the exact reason for this is not known with certainty, it is believed that to effect the desired trimming, the tool must be adjusted to a point of sufficient contact with the anvil that an appreciable pressure is developed therebetween at each stroke of the tool. With the tool vibrating at ultrasonic frequency, this causes an unacceptably rapid wear of the sealing tool.

Accordingly, it is an object of this invention to provide an improved anvil construction for an ultrasonic sealing machine.

It is a further object of this invention to provide an proved anvil which will not only itself have a long operating life but which will make possible an at least equally extended operating life for the tool operating therewith.

It is a further object of this invention to provide an improved anvil which is not, if any, materially more expensive than the prior art anvils.

It is a further object of this invention to provide an improved anvil which can be adjusted with respect to the anvil carriage so that various portions of the periphery of the anvil can be positioned for cooperation with the ultrasonic tool.

Other objects and advantages of the invention will become apparent to persons acquainted with equipment of this type upon reading the following disclosure and inspecting the accompanying drawings, in which:

FIGURE 2 is a front elevational view of an ultrasonic sealing machine embodying the invention.

FIGURE 3 is a top view of the ultrasonic sealing machine.

GENERAL DESCRIPTION

According to the present invention, there is provided an ultrasonic sealing machine comprising an elongated ultrasonic tool and means, such as an ultrasonic generator and a transducer, for effecting lengthwise back and forth movement of the tool at an ultrasonic frequency. An anvil has a working face opposed to the working face of the tool so that the plastic sheet material to be sealed and trimmed can be positioned between the working face of the anvil and the working face of the tool. The anvil is flexable rigidly to the frame of the machine so that its spacing from the ultrasonic tool can be precisely determined and accurately maintained. It is arranged for adjustability in order to present different working faces to the tool and thereby extend its useful life. More importantly, however, the anvil is made from material having a high degree of compressive strength and hardness yet a slight capacity for deformation together with a low heat conductivity. It is believed that the capacity of the material for deformation permits it to yield with respect to the tool suffciently that the tool does not bear against it sufficiently to create extreme appreciable pressure against it sufficiently to create extreme appreciable pressure against, and constant wear upon, the tool, but still the tool approaches the anvil with a substantially zero clearance therebetween whereby to apply to even a thin layer of material positioned therebetween the necessary pressure for both sealing and trimming thereof. One highly effective material for this purpose comprises a nonplastic, essentially nonmetallic, preferably fiber containing, block having other particular physical characteristics as set forth in more detail below.

DETAILED DESCRIPTION

Figure 1:
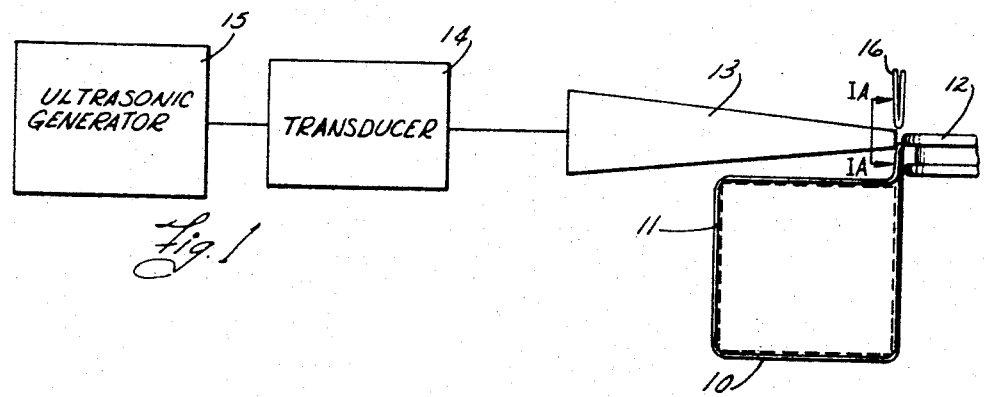
FIGURE 1 is a schematic view taken along the line I—I of FIGURE 1A and illustrating the essential apparatus involved in carrying out an ultrasonic sealing operation.
Figure 1A:
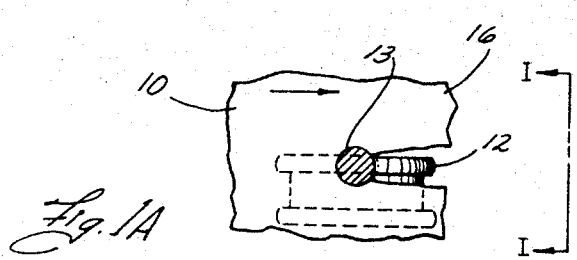
FIGURE 1A is a sectional view taken on the line IA—IA of FIGURE 1.

Referring to FIGURE 1, which schematically illustrates an ultrasonic sealing and cutting apparatus, a sheet 10 of a sealable plastic material, such as plasticized polyvinyl chloride shrink film, is wrapped around the object 11 to be packaged, such as a bottle. The ends, or edges of the sheet to be connected are laid together and placed between an anvil 12 and an ultrasonic tool 13. The tool 13 is expanded and contracted or vibrated at an ultrasonic frequency by a transducer 14 which is energized by a suitable ultrasonic generator 15. The tool 13 moves back and forth a short distance, usually about 0.001–0.004 inch, in a direction perpendicular to the sheet at an ultrasonic frequency, such as about 20,000 cycles per second. The mechanical compression and decompression of the film caused by movement of the tool 13 generates molecular heat which fuses the two layers of the sheet together to form a seam and it simultaneously cuts off excess sheet material as indicated at 16. The sheet can be moved continuously, or intermittently and rapidly, transversely between the tool and the anvil so that a continuous seam is formed.

Figure 4:
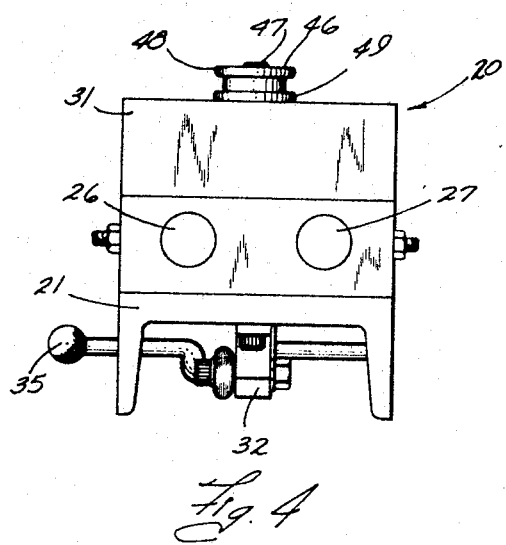
FIGURE 4 is an end view, taken from the right hand end of FIGURE 2, of the ultrasonic sealing machine.

Referring now to FIGURES 2–4 which disclose a specific ultrasonic cutting and sealing machine, the cutting and sealing machine 20 comprises an elongated frame 21 having a transducer section 22 (FIGURE 2) at one end thereof. There is disposed in the transducer section a conventional transducer 23, preferably of the magnetostrictive type, which is supplied with a pulsed electrical output from a suitable ultrasonic generator (not shown). The transducer 23 converts the pulsed electrical supply into mechanical vibrations, or expansions and contractions, of suitable ultrasonic frequency, such as about 20,000 cycles per second. An elongated ultrasonic tool 24 extends away from the transducer 23 and it is moved longitudinally back and forth thereby at the aforesaid ultrasonic frequency. The tool 24 preferably has a tungsten carbide disc 25 secured to the front end thereof for contacting the sheet to be sealed.

A pair of parallel elongated rods 26 and 27 extends lengthwise of the frame 21 parallel with the lengthwise axis of the tool 24. The rods 26 and 27 are mounted in blocks 28 and 29 which are affixed to the frame 21. An anvil-supporting carriage 31 is slideably mounted on the rods 26 and 27 for lengthwise movement therealong and said carriage has an undercarriage 32 (FIGURE 2) mounted on its lower side. The undercarriage 32 extends downwardly through an elongated slot 30 in the frame 21 and it is connected by a suitable resilient coupling 33 to a rod 34. The rod 34 is connected to a crank 36 and said crank is connected to a lever 35 which is pivotally mounted on the frame of the machine and which is adapted to be moved manually. It may be noted here that the carriage 31 is maintained normally stationary while a sealing operation is being carried out. The carriage 31 is moved away from the tool 24 when the plastic sheet material is being threaded between the tool and the hereinafter-mentioned anvil at the start of a sealing operation.

A micrometer head 41 is in this embodiment mounted on a micrometer clamp block 40 which is secured to the frame 21. The micrometer head 41 has an adjustable shaft 42 (FIGURE 2) which extends toward the carriage 31. A post 43 projects from the carriage 31 toward the micrometer head 41. The post 43 extends into a generally U-shaped opening 45 in the block 28 and the shaft 42 extends into an extension 45A of the opening 45 from the opposite side of the block and is adapted to abut against the end of the post 43 whereby to provide an adjustable stop for limiting movement of the carriage 31 toward the tool 20. Thus, where this adjustable stop means is used, the position of the shaft 42 can be precisely adjusted by suitable actuation of the micrometer head 41 so as to provide a precise control over the position of the anvil during the sealing operation.

An anvil 46 is mounted on the upper surface of the carriage 31 and in this embodiment is secured thereto by a screw 47. The anvil 46 may be made in various shapes but in this embodiment it is of generally circular shape and has flat upper and lower surfaces so that either of said surfaces can rest on the flat upper surface of the carriage 31. The anvil 46 here shown has a pair of vertically spaced, radially outwardly projecting flanges 48 and 49 whose forward ends project slightly beyond the carriage toward the tool 24. A portion of the periphery of the upper flange, here flange 48, is opposed to the working face of the tool 24 and cooperates therewith in carrying out the sealing operation. It will be apparent that when one portion of the periphery of flange 48 is worn, the screw 47 can be loosened so that the anvil can be rotated thereabout to position another portion of the periphery of the flange 48 for cooperation with the tool. Also, when the entirety of flange 48 is worn, the screw 47 can be removed and the anvil can be inverted so that flange 49 is positioned for cooperation with the tool 24. In this manner, the useful life of the anvil is greatly increased.

It is of critical importance that the anvil 46 be made of a material which is both capable of itself functioning effectively for an extended period of time and which will not unduly wear the ultrasonic tool. Anvils for this purpose have been made of a wide variety of materials but some of the materials were not capable of giving a satisfactory seal while other materials were not able to withstand the operating requirements and became unuseable after a short period of time and still others imposed an unacceptably rapid wear on the tool. We have discovered that the anvil must be made of a material having a relatively low thermal conductivity because a rapid removal of heat from the sealing zone detrimentally affects the quality of the seal. Also, the anvil must be made of a material having a relatively high softening point because the anvil becomes very hot in use and plastic materials will melt. The anvil must have sufficient hardness and rigidity under the temperature conditions involved that it will be capable of functioning effectively as a reaction member so that the sealing and cutting operation can be carried out in order to form a tight strong seal with a clean edge. Moreover, because the sealing operation may at times involve very substantial pressures, the anvil material must have sufficient compressive strength to be able to withstand the pressures imposed thereon. Also, the anvil must be capable of withstanding the stresses imposed thereon at the ultrasonic frequency over an extended period of time without wearing at an unduly rapid rate or becoming fatigued so as to cause cracking of the anvil and the anvil must have adequate flexural strength. On the other hand, the anvil must have a capacity for accepting a slight deforation so that it will yield to the pressure imposed thereupon by the tool and thereby form a working surface at the proper position to effect the desired sealing and trimming operation without imposing onto the tool the wear which resulted from the use of anvils according to the prior art.

We have discovered, unexpectedly in view of the prior art, that anvils having the particular physical properties set forth below are capable of meeting the foregoing requirements. These particular physical properties are, according to our present information, best obtainable from one-piece blocks made of nonplastic and essentially nonmetallic materials preferably containing some flexible fibers. The required physical properties are as follows:

(1) A modulus of elasticity of at least about $1.0 \times 10^6$ p.s.i., (2) A Brinnell hardness of at least about 15 (500 kg. load, 10 mm. diameter ball) or a Sceleroscope hardness of at least about 40, (3) A compressive strength of at least about 5000 p.s.i., (4) A thermal conductivity of less than about 6 B.t.u./hr./sq. ft./° F./in., and (5) A flexural strength of at least about 4000 p.s.i.

In addition to the foregoing-named properties, it is desirable that the anvil materials have the following additional properties:

(1) A specific gravity of at least about 75 lbs./ft.³,
(2) A tensile strength of at least about 1500 p.s.i., and
(3) A Charpy Impact reading of at least about 2.0 foot-pounds (ASTM Standard No. D256).

The following schedule lists a number of nonplastic, nonmetallic, flexible-fiber-containing products which are commercial available and which have been found to give satisfactory results.

| Material | Specific Gravity, lbs./ft.³ | Modulus of Elasticity, p.s.i., ×10⁵ | Brinnell Hardness, 500 kg., 10 mm. | Compressive Strength, p.s.i. | Tensile Strength, p.s.i. | Charpy Impact, 4 m. span × 5 in. × ½ in., foot-pounds | Flexural Strength, p.s.i. | Thermal Conductivity, B.t.u./hr./ft.²/° F./in. |
|---|---|---|---|---|---|---|---|---|
| Flexboard | 95 | 2.0 | 18 | 14,000 | 2,000 | | 5,000 | 4.5 |
| Carey AC | 95 | 1.9 | 20 | 14,000 | 2,240 | | ¹ 5,550 | 4.0 |
| Transite | 100 | 2.1 | 32 | 16,000 | 1,400 | 2.9 | ² 4,450 4,500 | 4.5 |
| Micro-Flexboard | 95 | 2.0 | 18 | 14,000 | 1,775 | 2.3 | ¹ 5,500 | 4.5 |
| Colorlith | 100 | 2.48 | 25 | 18,000 | 1,810 | | ² 4,500 4,500 | |
| Asbestocite | 95 | 1.8 | 18 | 14,000 | 1,775 | | | |
| Carbitex 100 | 85 | ¹ 1.6 | (³) | ¹ 8,000 ² 45,000 | ¹ 7,000 | | ¹ 14,000 | ¹ 1.0 ² .25 |

¹ With grain. ² Against grain. ³ Scleroscope: with grain, 90; against grain, 57.
Flexboard, Transite, Micro-Flex, Colorlith and Asbestocite are trademarks of Johns Manville Co. Carey AC is a trademark of Philip Carey Manufacturing Company. Carbitex is a trademark of Basic Carbon Corporation.

All of the foregoing-named materials except Carbitex are asbestos-Portland cement products, that is, Portland cement having asbestos fibers incorporated therein. In some instances the asbestos is in the form of randomly distributed staple fibers while in other cases the asbestos is present in the form of a woven fabric. The exact manner in which the asbestos is distributed in the Portland cement, therefore, appears to be of little or no significance. Carbitex 100 is a layered carbon cloth material bonded together with carbon to form a homogenous product.

It has been found that anvils made of the foregoing-named materials and having the foregoing-named physical properties are capable of functioning effectively, for periods of from eighty to forty working hours and the tool life is extended even more often in excess of one thousand hours. In contrast to this, anvils made of annealed and hardened steel, various types of plastics such as nylon, polyurethane, asphalt and vinyl asbestos tile and carbon motor brushes, mounted rigidly or resiliently, do not provide an effective seal, usually have a much shorter useful operating life, or wear the tool excessively as discussed above.

OPERATION

While the operation of the machine is believed to be apparent from the foregoing description, the same will be briefly described in order to insure a complete understanding of the invention.

Before a sealing operation is carried out, the micrometer head 41 is adjusted so that the shaft 42 thereof contacts the post 43 at a position which provides the desired position of anvil 46 with respect to the working face of the tool. This desired position may be such as to cause light intermittent contact between the anvil and the tool, or it may be such as to always maintain a small minimum spacing therebetween as may be required for the particular operation to be carried out. The shaft 42 and the post 43 provide a positive stop limting movement of the carriage toward the tool.

The foregoing adjustment can be effected before the ultrasonic generator is turned on. The generator is then turned on and the machine is warmed up for a suitable period of time in order to become stabilized and then the foregoing adjustments are checked again and any further adjustments needed can be carried out at this time.

The crank 36 is then operated in order to move the carriage 31 away from the tool 24. The sheet edges to be sealed are moved between the working face of the tool 24 and the working face of the anvil. The crank 36 is then operated in order to move the carriage 31 toward the tool 24 so that the plastic film is gripped therebetween. Operation of the ultrasonic tool 24 will effect formation of the seam and will simultaneously cut off the excess film material. The film can be moved in a continuous or rapid stepwise fashion transversely through the gap between the tool and the anvil in order to form a continuous seam on the plastic film.

Tests have shown that when the anvil is made within the parameters indicated above, it will be effective at any one position for upwards of eight hours and that by moving same from one position to another, a single anvil can be made to last for a very long period of time. Fifteen to twenty positions are usually possible for one anvil. Further, the use of this anvil produces very little wear on the tool so that a single tool will operate effectively for a very long time, often one thousand hours, without redressing or other attention given thereto. This contrasts with a tool life with the same type of tool of only a few hours at best, such as two to four hours when such tool is used with a steel or other conventional anvil, and an anvil life under such conditions of about four hours at best.

In starting a sealing machine using an anvil of the invention, same is adjusted so that the tool not only seals the film amaterial but also trims it as above indicated. This is believed to involve initially some degree of contact with the anvil. After a short period of operation, inspection of the anvil visually reveals a very slight flat area in the portion thereof under the tool. This suggests, though it is not yet proven, that the pressure of the tool, as transmitted through the plastic film, has caused the anvil to yield a position at which it is actually spaced slightly from the tool so it is not to receive direct impact therefrom but still by sufficiently narrow amount, such as practically zero, that the sealing and cutting action of the tool and anvil remain unimpaired.

It will be understood that automatic plastic film feeding units can be employed to feed the film between the tool and the anvil. Also, the electronic control for the ultrasonic generator may include provision for various adjustments of the power applied to the tool, an automatic frequency control and the like, but since these features form no part of the present invention, they are not further described herein.

While a particular preferred embodiment of the invention has been described, the invention contemplates such changes or modifications therein as lie within the scope of the appended claims.

The embodiments of the invention in which an exclusive property or privilege is claimed are defined as follows:

1. In an ultrasonic sealing machine having a frame, an ultrasonic transducer mounted on said frame and having an elongated tool projecting away therefrom, said tool having a transverse working face at the remote end thereof and an avil mounted on said frame and having a working face opposed to the working face of said tool, the improvement wherein said anvil is made of an essentially nonmetallic, nonplastic material having fibers therein.

2. In an ultrasonic sealing machine having a frame, an ultrasonic transducer mounted on said frame and having an elongated tool projecting away therefrom, said tool having a transverse working face at the remote end thereof and an anvil mounted on said frame and having a working face opposed to the working face of said tool, the improvement comprising said anvil being made of an essentially nonmetallic, nonplastic material, said anvil being made of a material having (1) a modulus of elasticity of at least about $1.0 \times 10^6$ p.s.i., (2) a Brinnell hardness of at least about 15 (500 kg. load, 10 mm. diameter ball) or a Sceleroscope hardness of at least about 40, (3) a compressive strength of at least about 5000 p.s.i., (4) a thermal conductivity of less than about 6 B.t.u./hr./sq. ft./° F./in., and (5) a flexural strength of at least about 4000 p.s.i.

3. An ultrasonic sealing machine according to claim 7, in which said anvil is made of a hard pressed asbestos cement composition.

4. An ultrasonic sealing machine according to claim 3 in which said asbestos cement composition has fibers therein.

5. An ultrasonic sealing machine according to claim 7, in which said anvil is made essentially of a layered carbon cloth material bonded together with carbon.

6. An ultrasonic sealing machine having a frame, an ultrasonic transducer mounted on said frame and having an elongated tool projecting away therefrom, said tool having a transverse working face at the remote end thereof and an anvil mounted on said frame and having a working face opposed to the working face of said tool, the improvement wherein said anvil is essentially made of a hard-pressed asbestos cement composition.

7. An ultrasonic sealing machine according to claim 12, in which the asbestos cement composition has flexible fibers therein.

8. An ultrasonic sealing machine having a frame, an ultrasonic transducer mounted on said frame and having an elongated tool projecting away therefrom, said tool having a transverse working face at the remote end thereof and an anvil mounted on said frame and having a working face opposed to the working face of said tool, the improvement wherein said anvil is essentially made of a layered carbon cloth material bonded together with carbon.

9. An anvil for an ultrasonic sealing machine, comprising:
a solid, one-piece substantially cylindrical block consisting of an essentially nonmetallic, nonplastic material containing flexible fibers therein, said cylindrical block having a pair of axially spaced annular flanges projecting radially outwardly from the periphery thereof with said annular flanges defining a working face, said block further having a coaxial opening formed therein and extending therethrough for receiving fastening means therein for securing said anvil to a support.

10. An ultrasonic sealing machine according to claim 1, in which the nonmetallic, nonplastic material has a high degree of compressive strength and hardness yet a slight capacity for deformation together with a low heat conductivity.

References Cited

UNITED STATES PATENTS

| | | | |
|---|---|---|---|
| 2,633,894 | 4/1953 | Carwile | 156—73 |
| 3,224,916 | 12/1965 | Soloff et al. | 156—73 |
| 3,291,669 | 12/1966 | Osher | 156—73 |
| 3,357,620 | 12/1967 | Bratschi | 29—470 |

DOUGLAS J. DRUMMOND, *Primary Examiner.*

U.S. Cl. X.R.

228—1